Feb. 19, 1957  KINJI TAKAHASHI  2,781,694
MICROSCOPE OBJECTIVE
Filed July 23, 1953

INVENTOR.
Kinji Takahashi
BY

United States Patent Office 2,781,694
Patented Feb. 19, 1957

2,781,694

MICROSCOPE OBJECTIVE

Kinji Takahashi, Otaku, Tokyo, Japan, assignor to Nippon Kogaku K. K., Tokyo, Japan, a corporation of Japan Application July 23, 1953, Serial No. 369,804

2 Claims. (Cl. 88—57)

This invention relates to an improved objective for microscopes.

The object of the present invention is to provide an achromatic objective for microscopes having superior resolving power to and including the peripheral regions of the field resulting from the excellent removal of various aberrations.

In achromatic objectives of medium or high magnification, the residual chromatic aberration and the relatively high curvature of field not only cause inconvenience in observation but also bring about disadvantages especially in taking microscopic photographs.

This invention is intended to provide a microscope objective wherein these disadvantages are removed, and the technical gist of this invention lies in the feature that glass having a small Abbe number $v$ and a large refractive index $n_d$, that is, glass having a high refractive index and a high degree of dispersion, is used for the positive lens at the end on the object side and that the focal distance of the lens at the said end is made larger than that of prior known microscope objectives.

According to the present invention, the chromatic aberration on the axis can be remarkably reduced and the field which can be simultaneously observed can be markedly increased, by reducing the Petzval sum to the extent of substantially half that of prior known microscope objectives, and the spherical aberration can be almost completely removed to the extent of half the Rayleigh limit. Furthermore, according to the present invention, it is possible to enlarge the radius of curvature, and hence the working surface curvature, of the lens at the end on the object side.

As it is obvious, however, that two kinds of chromatic aberration, that is, chromatic aberration on the axis and on the edge portion of the field, can not be removed by the same means, the chromatic aberration on the axis is removed in the present invention by means as disclosed above and the remaining chromatic aberration on the edge portion of the field is removed by means of a corrective eyepiece.

Figure 1:
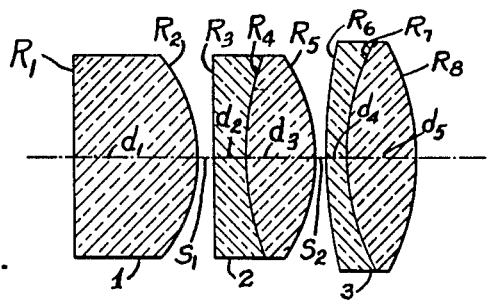
Figure 2:
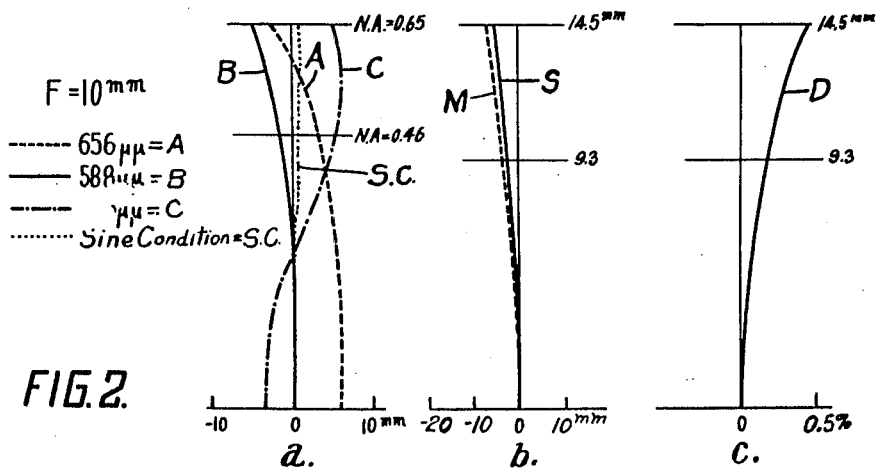
Figure 3:
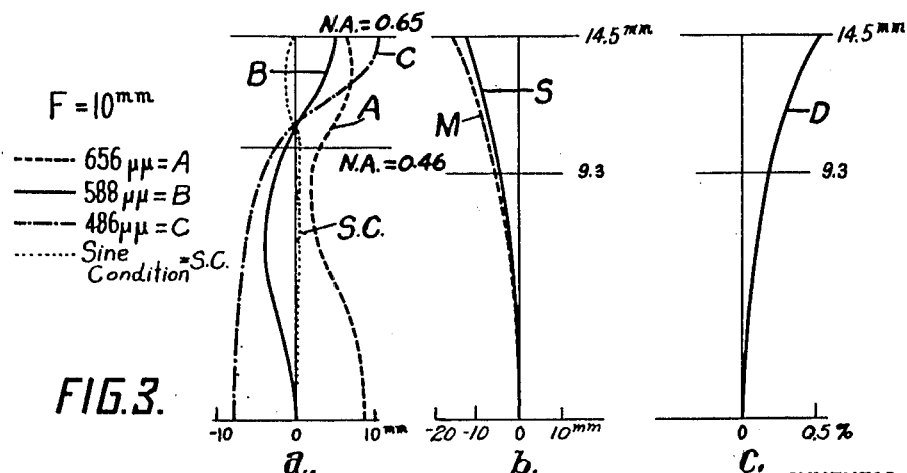

The present invention will be readily understood from the following description of an illustrative embodiment taken in connection with the appended drawing in which:

Figure 1 is an axial section through the lens system of the objective of the instant invention;

Figure 2 (a) discloses the graphs of the spherical and chromatic aberration of the instant objectives plotted on longitudinal spherical and chromatic aberration in millimeters as the horizontal axis and on numerical aperture or N. A as the vertical axis, Figure 2 (b) is the graphs of the field curvature and astigmatism plotted, the sagittal image in the full line and the meridional image in the dashed line, on the image distance as the horizontal axis and the image height as the vertical axis, and Figure 2 (c) discloses the graph of the distortion thereof with percentage distortion plotted horizontally and the image height in millimeter plotted vertically;

Figure 3 (a), (b) and (c) disclose, respectively, the graphs of the spherical and chromatic aberration, the field curvature and astigmatism, and the distortion of a prior known objective which shows very excellent features according to test results obtained by the Hartmann objective testing method or the interference microscope method.

Now, an embodiment of this invention as applied to a prior known type of objective wherein a single lens and two compound lenses spaced in air from each other in axial alignment are arranged as shown in Figure 1 shall be explained. First of all, a glass material of high refractive index, such as $2.5 > n_d > 1.71$, and of high dispersion, such as $40 > v > 20$, is employed for the lens 1 at the end on the object side, and the focal length is made larger than once the focal length of the objective but smaller than four times the same, whereby the Petzval sum is remarkably reduced and the plane of image is flattened. Thus the spherical aberration is reduced.

The large chromatic aberration necessarily caused by using glass of high dispersion for lens 1 is corrected by providing the compound lenses 2 and 3, also of glass, by which the difference of the spherical aberration due to the color difference is reduced as much as possible.

The constructional magnitudes for two illustrative embodiments or examples A and B of the instant invention are as follows, provided that the focal length of the lens at the end on the object side is 1.2 times the total focal length of the objective.

*Example A*

[Numerical aperture 0.65. Focal length 10 mm. Petzval sum 0.084.]

| Radius | Thickness or Spacing | $n_d$ | $v_d$ |
|---|---|---|---|
| $R_1 = \infty$ | $D_1 = 8.870$ | 1.741 | 27.7 |
| $R_2 = -8.994$ | $S_1 = 0.632$ | | |
| $R_3 = -93.612$ | $D_2 = 1.264$ | 1.741 | 27.7 |
| $R_4 = +18.785$ | $D_3 = 4.400$ | 1.487 | 69.0 |
| $R_5 = -11.982$ | $S_2 = 0.819$ | | |
| $R_6 = +44.065$ | $D_4 = 1.264$ | 1.741 | 27.7 |
| $R_7 = +15.923$ | $D_5 = 4.400$ | 1.487 | 69.0 |
| $R_8 = -20.523$ | | | |

*Example B*

[Numerical aperture 0.65. Focal length 10 mm. Petzval sum 0.084.]

| Radius | Thickness or Spacing | $n_d$ | $v_d$ |
|---|---|---|---|
| $R_1 = \infty$ | $D_1 = 8.694$ | 1.722 | 38.2 |
| $R_2 = -8.680$ | $S_1 = 0.626$ | | |
| $R_3 = -84.619$ | $D_2 = 1.252$ | 1.741 | 27.7 |
| $R_4 = +19.706$ | $D_3 = 4.359$ | 1.489 | 69.8 |
| $R_5 = -12.062$ | $S_2 = 0.209$ | | |
| $R_6 = +51.316$ | $D_4 = 1.252$ | 1.667 | 35.8 |
| $R_7 = +14.142$ | $D_5 = 5.518$ | 1.489 | 69.8 |
| $R_8 = -19.605$ | | | | where R is the radius of curvature of the refracting lens surfaces, D and S are the axial thickness, respectively axial separation, between the successive lens surfaces, $n_d$ is the index of refraction and $v_d$ the Abbe number of the lens glass, with the subscripts of R, D and S increasing from the object side of the lens and the + and − signs of R indicating surfaces respectively convex and concave to the front of the objective.

The Petzval sum of a prior known objective is approximately 0.12 and the focal length of the lens at the end on the object side is substantially 0.8 times the total focal length of the objective.

I claim:

1. An achromatic microscope objective with increased correction of spherical aberration and longitudinal color aberration, comprising a single front lens and two doublet lenses axially spaced in air and having the following magnitudes, where $R_{subscript}$ is the radius of the lens surfaces from the front to the rear of the objective with the + and − signs corresponding to surfaces which are respectively convex and concave to the front of the objective, $D_{subscript}$ and $S_{subscript}$ the axial distances between the successive lens surfaces in such direction, $n_d$ the index of refraction of the lens component, and $\nu_d$ the Abbe number of the lens component:

[Numerical aperture 0.65. Focal length 10 mm. Petzval sum 0.084.]

| Radius | Thickness or Spacing | $n_d$ | $\nu_d$ |
|---|---|---|---|
| $R_1 = \infty$ | $D_1 = 8.870$ | 1.741 | 27.7 |
| $R_2 = -8.994$ | $S_1 = 0.632$ | | |
| $R_3 = -93.612$ | $D_2 = 1.264$ | 1.741 | 27.7 |
| $R_4 = +18.785$ | $D_3 = 4.400$ | 1.487 | 69.0 |
| $R_5 = -11.982$ | $S_2 = 0.819$ | | |
| $R_6 = +44.065$ | $D_4 = 1.264$ | 1.741 | 27.7 |
| $R_7 = +15.923$ | $D_5 = 4.400$ | 1.487 | 69.0 |
| $R_8 = -20.523$ | | | |

2. An achromatic microscope objective with increased correction of spherical aberration and longitudinal color aberration, comprising a front single lens and two doublet lenses axially spaced in air and having the following magnitudes, where $R_{subscript}$ is the radius of the successive lens surfaces from the front to the rear of the objective with the + and − signs corresponding to surfaces which are respectively convex and concave to the front of the objective, $D_{subscript}$ and $S_{subscript}$ the axial distances between the successive lens surfaces in such direction, $n_d$ the index of refraction of the lens component, and $\nu_d$ the Abbe number of the lens component:

[Numerical aperture 0.65. Focal length 10 mm. Petzval sum 0.084.]

| Radius | Thickness or Spacing | $n_d$ | $\nu_d$ |
|---|---|---|---|
| $R_1 = \infty$ | $D_1 = 8.694$ | 1.722 | 38.2 |
| $R_2 = -8.680$ | $S_1 = 0.626$ | | |
| $R_3 = -84.619$ | $D_2 = 1.252$ | 1.741 | 27.7 |
| $R_4 = +19.706$ | $D_3 = 4.359$ | 1.489 | 69.8 |
| $R_5 = -12.062$ | $S_2 = 0.209$ | | |
| $R_6 = +51.316$ | $D_4 = 1.252$ | 1.667 | 35.8 |
| $R_7 = +14.142$ | $D_5 = 5.518$ | 1.489 | 69.8 |
| $R_8 = -19.605$ | | | |

References Cited in the file of this patent

UNITED STATES PATENTS

| | | |
|---|---|---|
| 198,914 | Gundlach | Jan. 1, 1878 |
| 1,662,339 | Sabel | Mar. 13, 1928 |
| 1,889,794 | Sabel | Dec. 6, 1932 |
| 2,192,295 | Berek | Mar. 5, 1940 |
| 2,313,460 | Warmisham | Mar. 9, 1943 |
| 2,324,081 | Herzberger | July 13, 1943 |
| 2,359,694 | Turner | Oct. 3, 1944 |